(No Model.)

N. J. THOMAS & B. D. SCHOFIELD.
POINTER FOR PLUMB LEVELS.

No. 247,711. Patented Sept. 27, 1881.

WITNESSES

Nathan J. Thomas
Benjamin D. Schofield,
INVENTORS,

By their Attorneys
Louis Bagger & Co.

UNITED STATES PATENT OFFICE.

NATHAN J. THOMAS AND BENJAMIN D. SCHOFIELD, OF FOWLERVILLE, MICHIGAN; SAID THOMAS ASSIGNOR TO SAID SCHOFIELD.

POINTER FOR PLUMB-LEVELS.

SPECIFICATION forming part of Letters Patent No. 247,711, dated September 27, 1881.

Application filed June 11, 1881. (No model.)

*To all whom it may concern:*

Be it known that we, NATHAN JOSEPH THOMAS and BENJAMIN D. SCHOFIELD, of Fowlerville, in the county of Livingston and State of Michigan, have invented certain new and useful Improvements in Level-Plumbs; and we do hereby declare that the following is a full, clear, and exact description of the invention, which will enable others skilled in the art to which it appertains to make and use the same, reference being had to the accompanying drawings, which form a part of this specification, and in which—

Figure 1:
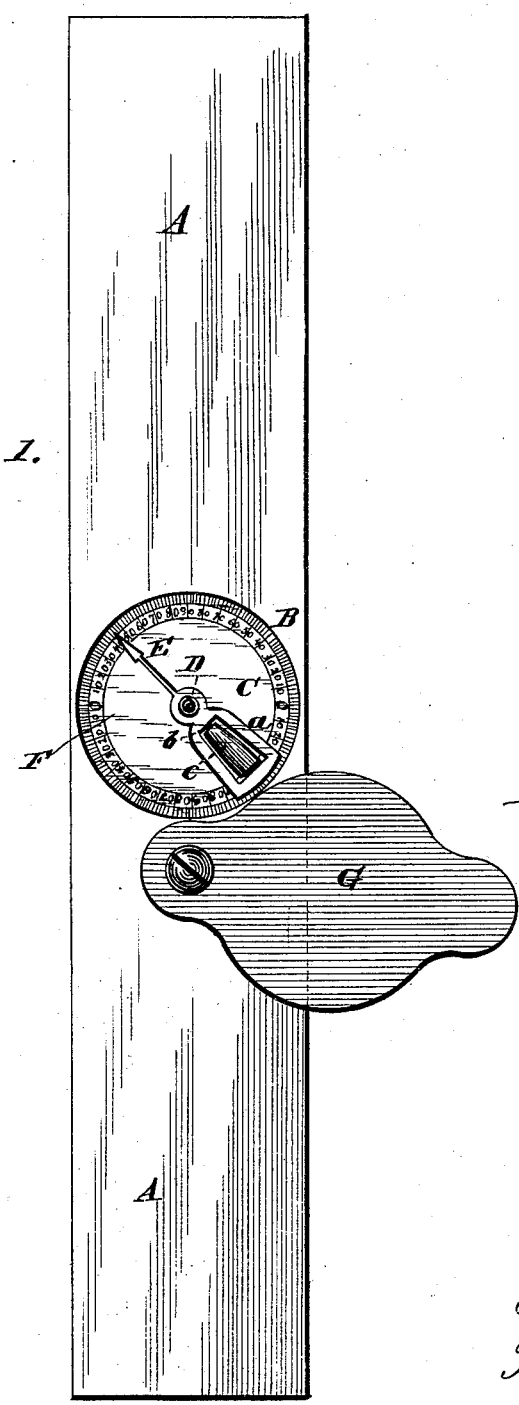
Figure 2:
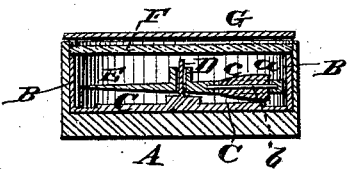

Figure 1 is a front view, and Fig. 2 is a diametrical section through the cup and pointer or indicator.

Similar letters of reference indicate corresponding parts in both the figures.

Our invention contemplates an improved construction of level-plumbs and angle-indicators, as hereinafter more fully described, and particularly pointed out in the claim.

In the annexed drawings, A is the body of the implement, which is of wood or any other suitable material, of any desired size.

B is a circular cup or recess, in the bottom of which is a circular graduated disk, C, having a central pivot or pintle, D, for the pointer E. The latter has an open base, $a$, within which is hung on the rod $b$ a weight or roller, $c$, of the configuration shown in the drawings. The cup or recess B has a glass cover, F, which may be protected by a slide or shield, G, when the instrument is not in use.

If desired, the graduated disk C may have a Vernier attachment to adapt the instrument to indicate variations of $\frac{60}{360}$ degrees or 60 minutes. The main scale may either be from 0 to 360, or it may be subdivided into four quarters, marked from 0 to 45 each; or any other subdivision may be used, according to the particular purpose for which the instrument is to be used, as we do not limit ourselves to any particular scale or graduation of the disk C.

The roller $c$ serves the double purpose of weighting the end of the pointer and of steadying it and preventing undue vibrations by its frictional contact with the disk C, thus saving time in reading off the indications and contributing to their accuracy.

Having thus described our invention, we claim and desire to secure by Letters Patent of the United States—

The improved level-plumb and angle-indicator, having the circular cup or recess B, graduated disk C, pivot D, and pointer E, provided with the weighted roller $c$, constructed and arranged to operate substantially as and for the purpose herein shown and described.

In testimony that we claim the foregoing as our own we have hereunto affixed our signatures in presence of two witnesses.

NATHAN JOSEPH THOMAS.
BENJAMIN D. SCHOFIELD.

Witnesses:
GEORGE L. ADAMS,
JAMES MCCARTY.